Feb. 4, 1930.                P. R. HANNA                 1,745,674
                          EDUCATIONAL DEVICE
                         Filed Nov. 26, 1927
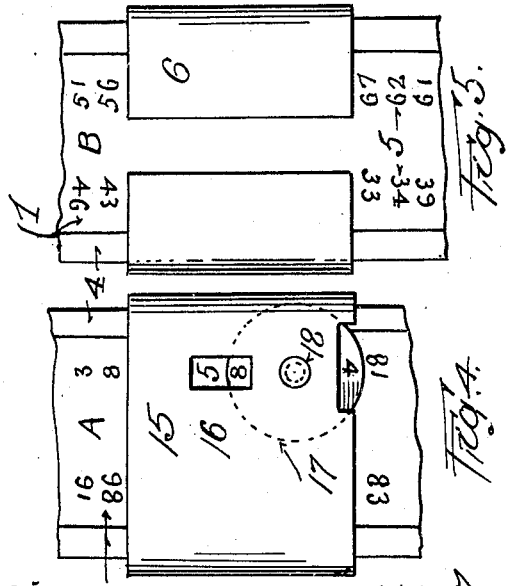
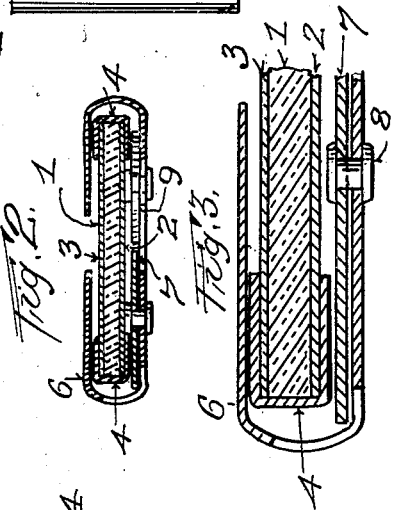
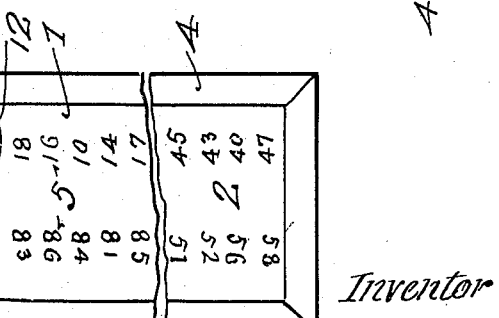
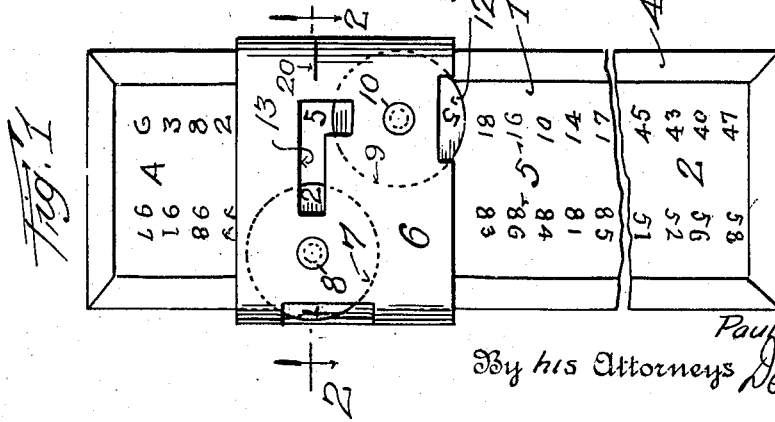
Inventor
Paul R. Hanna
By his Attorneys Patented Feb. 4, 1930

1,745,674

UNITED STATES PATENT OFFICE

PAUL R. HANNA, OF NEW YORK, N. Y.

EDUCATIONAL DEVICE

Application filed November 26, 1927. Serial No. 235,799.

This invention relates to educational devices.

One of the objects of this invention is the provision of a device adapted for use in instructing persons in the combination of symbols.

A further object of this invention is the provision of a device for use in instructing persons, and especially children, in the simple processes of addition, subtraction, multiplication, and division.

A further object of this invention is the provision of a stick having a plurality of columns of numbers thereon and a slide with an opening therein to move back and forth on the stick to expose the numbers through the opening.

A further object of this invention is the provision of rotatable dials on said slide having numbers adjacent their periphery and arranged so that these numbers may also be exposed through the opening on the slide.

These and other objects, as will appear from the following disclosure, are secured by means of this invention.

This invention resides substantially in the combination, construction, arrangement, and relative location of parts as will appear from the following disclosure which has been given in an illustrative sense rather than with the idea of limiting the invention.

Referring to the drawings—

Figure 1 is a plan view of one side of the device.

Fig. 2 is a cross sectional view taken on the line 2—2 of Fig. 1.

Fig. 3 is an enlarged end view of the portion of the cross sectional view of Fig. 2.

Fig. 4 is a plan view of a modification of the device.

Fig. 5 is a bottom plan view of the slide used in either arrangement of Figs. 1 and 4.

Fig. 6 is a plan view of the dial or answer sheet.

As far as I am aware, very little of a practical nature has heretofore been accomplished to aid instructors in teaching others, especially children, in the simple mathematical processes. It may be pointed out here that while I have specifically disclosed my device in connection with mathematical processes, I wish it to be understood that instead of number symbols other symbols may be used which would permit of the use of the device in teaching phonetics, drills in grammar, or in the study of punctuation.

To better understand the device reference is made to the drawings in which a thin rectangular stick 1 made of any suitable material such as wood, metal, cardboard, composition materials, and the like, is provided with two facing strips 2 and 3 which may, for instance, be made of heavy paper or celluloid. The edges of the stick are provided with a suitable binding tape as shown at 4. In the form of the device shown each face of the stick is provided with two columns of figures arranged thereon without any particular sequence. It may be pointed out here that either whole numbers, fractions, or decimal numbers may be employed or other symbols, such as punctuation marks, words, and the like, depending upon the use to which the device is to be put.

At 6 is shown a slide which is adapted to be moved backwards and forwards on the stick. This slide may be made of any suitable material and is provided, in the arrangement in Fig. 1, with the dial 7 rotatably mounted thereon by means of the rivet 8 and the dial 9 likewise rotatably secured thereto by means of the rivet 10. The slide is provided with an L-shaped opening 13 through which the numbers on the stick appear one at a time as the slide is moved over the stick. Likewise the numbers on the rotatable dials appear in this opening, as for instance number 2 on the dial 7.

In Fig. 6 is shown the answer sheet which for mathematical processes is provided with four main columns headed "Addition", "Subtraction", "Multiplication", and "Division". Each of these main columns is divided into two sub-columns marked "A" and "B". The significance of this is that when the side of the stock marked "A" is being employed for any of the processes the column "A" on the dial or answer sheet is employed.

The modification shown in Fig. 4 comprises the stick 1 as before and a slide 15 which is provided with an opening 16 and one dial 17 rotatably mounted thereon by means of the rivet 18.

To further understand the operation of this device a simple problem will be carried out. When the pupil is first being instructed in the process of addition, for instance, he is provided with one of these devices and the instructor gives him the particular problem he is to perform. If, for instance, he is requested to add 2 and 5 he moves the slide 6 over the stick until the number 5 appears through the opening 13 in the slide. The dial 7 is then rotated until the number 2 appears in the opening and the problem is then arranged before him in its proper form. The pupil is likewise provided with the dial or answer sheet of which there is one sheet for each of the numerals 0 to 9 which appear on the dials. Since the operator number the pupil is working with is the number 2 he takes the dial or answer sheet which contains the answers for all of the problems that can be worked out with the device employing the operator number 2 and places the stick alongside of the dial or answer sheet so that the top number in the columns on the stick are directly opposite the top numbers on the dial sheet as is clearly shown by considering Figs. 1 and 6 together. If, as has been described, the problem consists in adding 2 and 5 it will be noticed that the answer is directly opposite the pointer 20 on the slide 6, in column "A" in the main column marked "Addition".

If the problem is to multiply 2 × 5 it will be noted that the answer 10 is in the first column "A" in the main column marked "Multiplication". The stick may, of course, be placed adjacent this column if desired. The two rows of figures under the heading "A" represent the answers for the two columns of figures on the side "A" of the stick. The reason for providing two columns of figures on each side of the stick is merely to provide several different sequences of figures so that the pupil may not become too familiar with their arrangement.

If the processes of subtraction and division are to be carried out then the dial 7 is moved so that no number appears in the opening 13 and the dial 9 is employed so that here again the numbers are in their usual relation in carrying out this operation. It is understood that either dial 7 or 9 of Fig. 1 or dial 17 of Fig. 4 may be used singly for each of the four operations—addition, subtraction, multiplication, or division.

The arrangement of Fig. 4 is provided for more advanced students. It is apparent that the numbers on the dials may consist if desired of more than one digit so as to further complicate the problems for which it may be used.

After the pupil has become fairly familiar with these operations the dial or answer sheets, which are really answer books, may be closed and the pupil provided with pads ruled just like the dial sheets and then instructed to carry out the different operations using the different operators and marking the answers in the correct columns on the ruled pad. These sheets may then be compared with the dial or answer sheets to ascertain their correctness.

As has been stated above, symbols other than numbers may be employed. For instance, the spelling of various words can be carried out as will be readily apparent to those skilled in the art. It is, of course, to be understood that more than one or two dials may be employed on the slide.

I am also aware that many changes in the details of construction and relative arrangement of parts will readily occur to those skilled in the art. I also wish it to be understood that under the term "symbol," as used in this disclosure, I intend to include any forms of marks which need not necessarily be numbers. I do not, therefore, desire to be limited to the particular disclosure given for purpose of illustration but rather to the principle of my invention as it is defined in the appended claims.

What I seek to secure by United States Letters Patent is:—

1. In an educational device of the type described, the combination with a stick having a plurality of symbols thereon, of a slide on said stick, at least one rotatable member on said slide having a plurality of symbols thereon whereby a plurality of symbol combinations may be obtained by moving the slide on the stick and rotating the member on the slide.

2. In an educational device of the type described, the combination with a stick having a plurality of symbols thereon, of a slide on said stick, having an opening therein to expose the symbols on the stick and rotatable means on the slide having symbols thereon to be exposed in said opening upon rotation of said means whereby various combinations of symbols on the stick and slide may be secured.

3. In an educational device for providing a multiplicity of mathematical problems in addition, subtraction, multiplication, and division, the combination with a stick having a plurality of numbers thereon arranged in rows, of a slide for said stick having an opening therein and movable means in said opening having a series of numbers thereon whereby various combinations of the numbers on the stick and movable means appear in said opening to indicate the problem.

4. In a device as described the combination with a stick having at least one row of numbers thereon, of a slide having an opening through which the numbers on the stick appear as the slide is moved along the stick and at least one movable member mounted on said slide having numbers thereon, said member being arranged so that the numbers appear in the opening on said slide.

5. In an educational device of the type described the combination with a stick having a plurality of symbols thereon of a slide on said stick adapted to be moved longitudinally thereon and having a plurality of symbols thereon, whereby various combinations of the symbols on the stick and slide may be secured, and a dial sheet having the results of the said various combinations of symbols arranged thereon whereby the results will be apparent when the stick and dial sheet are arranged so that the symbols on the stick and dial sheet are in alignment.

6. The combination with the device of claim 3, of a dial sheet having a plurality of numbers thereon representing the results of the various number combinations obtainable with the stick and scale when said stick and dial sheet are placed in a predetermined alignment.

In testimony whereof I have hereunto set my hand on this 22nd day of November A. D., 1927.

PAUL R. HANNA.